US007165447B2

(12) United States Patent
Miyahara et al.

(10) Patent No.: US 7,165,447 B2
(45) Date of Patent: Jan. 23, 2007

(54) FAILURE DIAGNOSTIC APPARATUS FOR FUEL VAPOR PURGE SYSTEM AND FUEL VAPOR PURGE APPARATUS AND COMBUSTION ENGINE HAVING FAILURE DIAGNOSTIC APPARATUS

(75) Inventors: Hideki Miyahara, Nishikamo-gun (JP); Tokiji Ito, Toyota (JP); Kenji Nagasaki, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 3 days.

(21) Appl. No.: 11/099,614

(22) Filed: Apr. 6, 2005

(65) Prior Publication Data

US 2005/0229689 A1 Oct. 20, 2005

(30) Foreign Application Priority Data

Apr. 14, 2004 (JP) ............................ 2004-119062

(51) Int. Cl.
*G01M 15/00* (2006.01)

(52) U.S. Cl. ..................................................... 73/118.1

(58) Field of Classification Search .................... 73/40, 73/46, 47, 49.7, 116, 117.2, 117.3, 118.1
See application file for complete search history.

(56) References Cited

U.S. PATENT DOCUMENTS

| | | | | |
|---|---|---|---|---|
| 6,474,148 | B1 * | 11/2002 | Takagi et al. | 73/118.1 |
| 6,971,375 | B1 * | 12/2005 | Amano et al. | 123/520 |
| 2004/0250604 | A1 * | 12/2004 | Watanabe et al. | 79/49.2 |
| 2005/0005917 | A1 * | 1/2005 | Veinotte | 123/520 |
| 2005/0217348 | A1 * | 10/2005 | Amano et al. | 73/49.7 |
| 2005/0229688 | A1 * | 10/2005 | Miyahara et al. | 73/118.1 |

FOREIGN PATENT DOCUMENTS

| | | |
|---|---|---|
| JP | 2003-269265 | 9/2003 |

* cited by examiner

*Primary Examiner*—Eric S. McCall
(74) *Attorney, Agent, or Firm*—Kenyon & Kenyon LLP

(57) ABSTRACT

When a purge amount while an engine is running is a first purge amount and the purge amount before failure diagnosis is larger than a required purge amount, an amount adsorbed in a canister before the failure diagnosis is executed is smaller than a predetermined determination value. Accordingly, an ECU executes the failure diagnosis. When the purge amount while the engine is running is a second purge amount and the purge amount before the failure diagnosis is equal to or smaller than the required purge amount, the amount adsorbed in the canister before the failure diagnosis is equal to or larger than the predetermined determination value. Accordingly the ECU does not execute the failure diagnosis. The required purge amount used for determining whether or not the failure diagnosis can be executed is determined according to the temperature before the failure diagnosis.

14 Claims, 6 Drawing Sheets

| TEMPERATURE (°C) | 0 | 10 | 20 | 30 | 35 | 40 |
|---|---|---|---|---|---|---|
| REQUIRED PURGE AMOUNT (g) | 50 | 50 | 50 | 70 | 70 | 100 |

FAILURE DIAGNOSTIC APPARATUS FOR FUEL VAPOR PURGE SYSTEM AND FUEL VAPOR PURGE APPARATUS AND COMBUSTION ENGINE HAVING FAILURE DIAGNOSTIC APPARATUS

This nonprovisional application is based on Japanese Patent Application No. 2004-119062 filed with the Japan Patent Office on Apr. 14, 2004, the entire contents of which are hereby incorporated by reference.

BACKGROUND OF THE INVENTION

1. Field of the Invention

The present invention relates to a failure diagnostic apparatus for a fuel vapor purge system that purges fuel vapor generated in a fuel tank into an intake system and, to a fuel vapor purge apparatus and a combustion engine having the failure diagnostic apparatus.

2. Description of the Background Art

Vehicles with a fuel tank containing volatile liquid fuel generally have a fuel vapor purge system for purging fuel vapor generated in the fuel tank into an intake system. With such a fuel vapor purge system, the fuel vapor generated in the fuel tank is temporarily adsorbed and collected by a canister connected via a vapor passage to the fuel tank and thereafter purged into an air intake passage of an engine connected via a purge passage to the canister.

Most of fuel vapor purge systems of the above-described type have, with the purpose of ensuring the system reliability, a failure diagnostic apparatus for detecting leakage of fuel vapor due to opening of some hole(s) or crack(s) for example of a path including the fuel tank, vapor passage, canister, and purge passage (this path is hereinafter referred to as “evaporation path”). Such a failure diagnostic apparatus uses an electric pump to generate a pressure difference between the inside and the outside of the evaporation path, measures the pressure within the evaporation path, and compares the measured pressure with a predetermined reference pressure to conduct diagnosis for determining whether or not leakage from the evaporation path occurs.

Japanese Patent Laying-Open No. 2003-269265 discloses a failure diagnostic apparatus for a fuel vapor purge system like the aforementioned one. In consideration of influences of the generation of fuel vapor on the internal pressure of the evaporation path, the failure diagnostic apparatus uses a reference pressure that is generated when a pressure is applied to a reference hole having its diameter equal to the diameter of a hole which will cause an abnormality to be detected, the reference pressure being corrected using a pressure detected in advance when the fuel vapor is generated. The corrected reference pressure is used to determine whether or not leakage from the evaporation path occurs.

The failure diagnostic apparatus disclosed in Japanese Patent Laying-Open No. 2003-269265 can thus be used to improve precision with which whether or not leakage failure of the evaporation path occurs is determined.

Regarding the failure diagnostic apparatus disclosed in Japanese Patent Laying-Open No. 2003-269265, however, when the failure diagnosis is conducted while the inside of the canister is filled with the fuel vapor, the fuel vapor adsorbed in the canister could be discharged to the outside, or the fuel vapor present in the fuel tank could be discharged to the outside without being adsorbed in the canister, when a pressure is applied to the inside of the evaporation path.

SUMMARY OF THE INVENTION

The present invention has been made for solving the aforementioned problems and an object of the present invention is to provide a failure diagnostic apparatus for a fuel vapor purge system reducing an amount of fuel vapor discharged to the outside while failure diagnosis is conducted.

Another object of the present invention is to provide a fuel vapor purge apparatus having a failure diagnostic apparatus reducing an amount of fuel vapor discharged to the outside while failure diagnosis is conducted.

Still another object of the present invention is to provide a combustion engine having a failure diagnostic apparatus reducing an amount of fuel vapor discharged to the outside while failure diagnosis is conducted.

According to the present invention, a failure diagnostic apparatus for a fuel vapor purge system adsorbing in a canister fuel vapor generated in a fuel tank and purging the adsorbed fuel vapor into an intake system includes: a pressure difference generation unit for generating, when failure diagnosis is executed, a pressure difference between respective pressures inside and outside a fuel vapor path including the fuel tank and the canister; a failure diagnostic unit for comparing, with a predetermined reference pressure, the pressure inside the fuel vapor path when the pressure difference generation unit generates the pressure difference, for conducting the failure diagnosis to determine whether failure occurs or not based on result of the comparison; and an execution determination unit for determining, based on whether or not an amount of fuel vapor in the fuel vapor path is smaller than a predetermined reference amount, whether or not the failure diagnosis is to be executed by the pressure difference generation unit and the failure diagnostic unit.

Preferably, the execution determination unit determines, when an amount of fuel vapor adsorbed in the canister is smaller than a first predetermined amount, that the amount of fuel vapor in the fuel vapor path is smaller than the predetermined reference amount.

Preferably, the execution determination unit estimates the amount of fuel vapor adsorbed in the canister based on a purge amount of the fuel vapor.

Preferably, the purge amount is cumulative purge amount while a combustion engine is running before the failure diagnosis.

Preferably, the execution determination unit determines, when the purge amount of the fuel vapor is larger than a second predetermined amount, that the amount of fuel vapor adsorbed in the canister is smaller than the first predetermined amount.

Preferably, the second predetermined amount is larger as temperature of the fuel vapor purge system is higher.

Preferably, the second predetermined amount is larger as an increase in temperature of the fuel vapor purge system is larger.

Preferably, the execution determination unit calculates the purge amount based on a valve-opening period of time of a purge control valve provided on a purge passage connecting the canister to the intake system.

Further, according to the present invention, a failure diagnostic apparatus for a fuel vapor purge system adsorbing in a canister fuel vapor generated in a fuel tank and purging the adsorbed fuel vapor into an intake system includes: a pressure difference generation unit for generating, when failure diagnosis is executed, a pressure difference between respective pressures inside and outside a fuel vapor path including the fuel tank and the canister; a failure diagnostic unit for comparing, with a predetermined reference pressure, the pressure inside the fuel vapor path when the pressure difference generation unit generates the pressure difference, for conducting the failure diagnosis to determine whether failure occurs or not based on result of the comparison; a concentration detection unit for detecting a concentration of the fuel vapor in the fuel vapor path; and an execution determination unit for determining, based on whether or not the concentration of the fuel vapor detected by the concentration detection unit is lower than a predetermined value, whether or not the failure diagnosis is to be executed by the pressure difference generation unit and the failure diagnostic unit.

Preferably, the pressure difference generation unit generates a negative pressure, relative to outside air, in the fuel vapor path.

According to the present invention, a fuel vapor purge apparatus includes the failure diagnostic apparatus for the fuel vapor purge system as described above.

According to the present invention, a combustion engine includes the failure diagnostic apparatus for the fuel vapor purge system as described above.

The execution determination unit of the failure diagnostic apparatus for the fuel vapor purge system, in accordance with the present invention, determines whether failure diagnosis is to be executed or not, based on an amount of fuel vapor in the evaporation path. When the amount of fuel vapor in the evaporation path is large, the failure diagnosis is not carried out.

Thus, in accordance with the present invention, the fuel vapor can be prevented from being discharged to the outside.

Further, the execution determination unit of the failure diagnostic apparatus for the fuel vapor purge system, in accordance with the present invention, determines whether the amount of fuel vapor in the path is smaller than a predetermined reference amount, based on an amount of fuel vapor adsorbed in the canister. The execution determination unit estimates the amount of fuel vapor adsorbed in the canister, based on a purge amount of fuel vapor.

Thus, in accordance with the present invention, whether or not failure diagnosis is to be executed can be determined without detecting the amount of fuel vapor adsorbed in the canister that is difficult to directly measure.

Further, regarding the failure diagnostic apparatus for the fuel vapor purge system, in accordance with the present invention, a larger purge amount in advance of failure diagnosis is necessary as the temperature or increase in temperature of the fuel vapor purge system is higher/larger.

Thus, in accordance with the present invention, the determination as to whether or not the failure diagnosis is to be executed can be made with higher precision in consideration of the temperature of the fuel vapor purge system.

Further, in accordance with the present invention, the execution determination unit calculates the purge amount based on an opening period of time of the purge control valve. Therefore, it is unnecessary to separately provide a device for detecting the purge amount.

Further, the execution determination unit of the failure diagnostic apparatus for the fuel vapor purge system, in accordance with the present invention, determines whether failure diagnosis is to be executed or not, based on a concentration of fuel vapor detected by the concentration detection unit. When the concentration of fuel vapor in the evaporation path is high, failure diagnosis is not carried out.

Thus, in accordance with the present invention as well, the fuel vapor can be prevented from being discharged to the outside.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
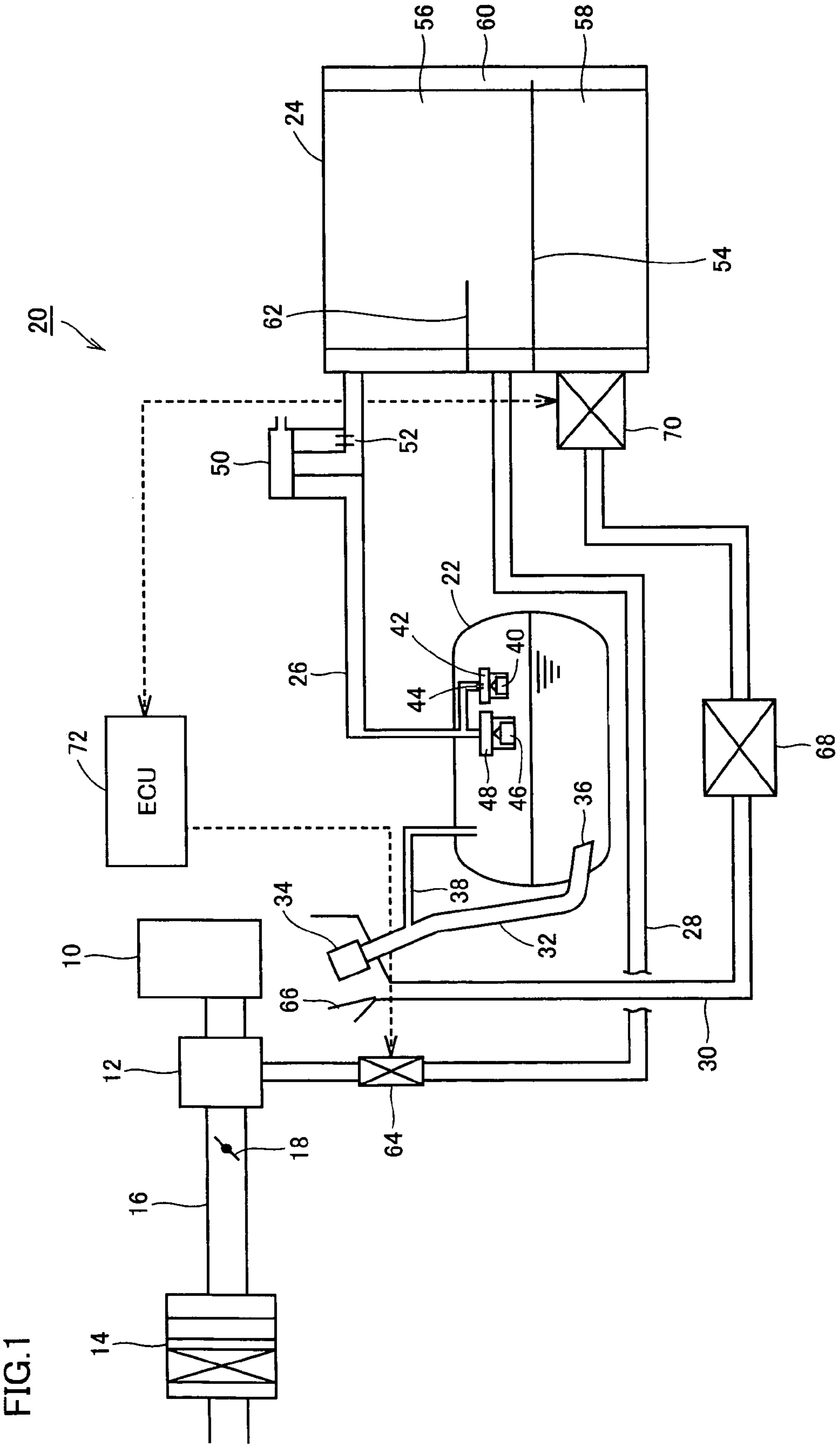
FIG. 1 schematically shows a structure of a fuel vapor purge system having a failure diagnostic apparatus according to the present invention.

Embodiments of the present invention are hereinafter described in detail with reference to the drawings. Like components in the drawings are denoted by like reference characters and a description thereof is not repeated here.

First Embodiment

FIG. 1 schematically shows a structure of a fuel vapor purge system having a failure diagnostic apparatus according to the present invention.

Referring to FIG. 1, fuel vapor purge system 20 includes a fuel tank 22, a canister 24, a vapor passage 26, a purge passage 28, an internal pressure valve 50, a purge control valve 64, an atmosphere intake passage 30, a dust filter 68, an electric pump module 70, and an ECU (Electronic Control Unit) 72. Fuel tank 22 is connected via vapor passage 26 to canister 24. Canister 24 is connected via purge passage 28 to a surge tank 12. Internal pressure valve 50 is provided on vapor passage 26 and purge control valve 64 is provided on purge passage 28. Atmosphere intake passage 30 is connected via electric pump module 70 to canister 24 and dust filter 68 is provided on atmosphere intake passage 30.

An engine 10 supplied with fuel by this fuel vapor purge system 20 is connected to surge tank 12. Surge tank 12 is connected to an air intake passage 16 directing intake air to engine 10 and further connected to purge passage 28 to mix fuel vapor supplied from purge passage 28 with the intake air from air intake passage 16 and supply the mixture to engine 10. A throttle valve 18 is provided upstream from surge tank 12 on air intake passage 16, and an air cleaner 14 is provided further upstream therefrom.

Fuel tank 22 includes float valves 40, 46, liquid pools 42, 48 and a throttle 44. Float valve 40, liquid pool 42 and throttle 44 are connected to the upper wall of fuel tank 22 and connected to one of branches, in fuel tank 22, of vapor passage 26. Float valve 46 and liquid pool 48 are connected to the other branch of vapor passage 26.

Fuel tank 22 is connected to an oil feed pipe 32. An oil inlet of oil feed pipe 32 has a cap 34 and an outlet of oil feed pipe 32 has a check valve 36. A circulation path 38 branches from oil feed pipe 32, and an opening end of circulation path 38 is located in an upper space in fuel tank 22.

Vapor passage 26 is a passage for delivering fuel vapor generated in fuel tank 22 to canister 24. Internal pressure valve 50 is provided in the vicinity of canister 24 on vapor passage 26 and has in itself a diaphragm and a throttle 52. When the internal pressure of fuel tank 22 is lower than a valve-opening pressure of internal pressure valve 50, the diaphragm is at a valve-closing position so that internal pressure valve 50 connects fuel tank 22 to canister 24 via throttle 52. When the internal pressure of fuel tank 22 then reaches the valve-opening pressure of internal pressure valve 50, the diaphragm moves to a valve-opening position so that internal pressure valve 50 connects fuel tank 22 to canister 24, not via throttle 52.

Canister 24 includes an adsorbent for adsorbing, by the adsorbent, the fuel vapor supplied via vapor passage 26 from fuel tank 22 and temporarily stores the fuel vapor. When surge tank 12 connected via purge passage 28 to canister 24 applies a negative pressure to canister 24, canister 24 discharges (purges) the fuel vapor adsorbed in the adsorbent into surge tank 12 via purge passage 28.

Canister 24 includes a partition plate 54, adsorbent chambers 56, 58, a ventilation filter 60, and a guide 62. Adsorbent chambers 56, 58 are filled with the adsorbent, separated by partition plate 54, and connected to each other via ventilation filter 60. Adsorbent chamber 56 is connected via vapor passage 26 to fuel tank 22 and also connected via purge passage 28 to surge tank 12. Adsorbent chamber 58 is connected via atmosphere intake passage 30 to the outside. Guide 62 is provided to permit the fuel vapor flowing from fuel tank 22 via vapor passage 26 into canister 24 to be adsorbed temporality by the adsorbent and thereafter purged into purge passage 28.

Purge control valve 64 operates in response to a control command from ECU 72. When purge control valve 64 opens, a negative pressure generated in surge tank 12 while engine 10 is running is applied via purge passage 28 into canister 24.

Atmosphere intake passage 30 is a passage for supplying, via electric pump module 70 into canister 24, air entering from an inlet opening 66 provided at an opening used for feeding oil. Dust filter 68 removes dust particles included in the air supplied from inlet opening 66.

Electric pump module 70 includes an electric air pump, a switching valve, a reference hole, and a pressure sensor (these are not shown). Electric pump module 70 operates in response to a control command from ECU 72. While engine 10 is running, electric pump module 70 connects canister 24 to atmosphere intake passage 30 without operating the electric air pump.

When failure diagnosis is performed on fuel vapor purge system 20, electric pump module 70 operates the electric air pump in response to a control command from ECU 72 to generate a negative pressure in canister 24 and the reference hole that is used for obtaining a determination value used for the failure diagnosis. Electric pump module 70 then detects with the pressure sensor the pressure in the reference hole and canister 24 when the negative pressure is generated, and outputs the detected pressure values to ECU 72. The operation of fuel vapor purge system 20 when the failure diagnosis is performed thereon is hereinlater described in detail.

ECU 72 includes a CPU (Central Processing Unit), a ROM (Read-Only Memory), a RAM (Random-Access Memory), an A/D (Analog/Digital) converter, and an input/output interface for example. Based on such information detected by various sensors (not shown) as the number of revolutions of engine 10, amount of intake air, air-fuel ratio of an exhaust system, and vehicle speed, ECU 72 carries out such various types of control concerning operation of engine 10 as fuel injection control. Further, ECU 72 controls purge control valve 64 and controls purging of fuel vapor purge system 20. Furthermore, ECU 72 controls electric pump unit 70 to perform failure diagnosis on fuel vapor purge system 20 based on the detected values of the pressure from the pressure sensor of electric pump unit 70.

In this fuel vapor purge system 20, fuel vapor generated in fuel tank 22 while engine 10 is running flows into canister 24 via vapor passage 26 to be adsorbed temporarily by the adsorbent in canister 24. When purge control valve 64 opens in response to a control command from ECU 72, a negative pressure is applied from surge tank 12 via purge passage 28 into canister 24. Then the fuel vapor adsorbed in canister 24 is purged from canister 24 via purge passage 28 into surge tank 12.

The failure diagnosis for fuel vapor purge system 20 is now described. Electric pump module 70 and ECU 72 constitute the failure diagnostic apparatus for fuel vapor purge system 20. When the failure diagnosis is conducted on fuel vapor purge system 20, electric pump module 70 first moves the switching valve based on a control command from ECU 72 to form a path comprised of atmosphere intake passage 30, the electric air pump and the reference hole. Electric pump module 70 then drives the electric air pump based on a control command from ECU 72 to generate a negative pressure in the reference hole. Electric pump module 70 thereafter detects with the pressure sensor the pressure between the electric air pump and the reference hole to output the detected pressure to ECU 72.

The reference hole is made equal in size to a hole to be detected in the evaporation passage of fuel vapor purge system 20, and a first pressure detected at this time by the pressure sensor is a determination value used for the failure diagnosis on the evaporation passage.

When the determination value for the failure diagnosis is determined using the reference hole, electric pump module 70 moves the switching valve based on a control command from ECU 72 to form a path comprised of canister 24, the electric air pump and atmosphere intake passage 30. Then, based on a control command from ECU 72, electric pump module 70 drives the electric air pump to generate a negative pressure in canister 24. Electric pump module 70 detects with the pressure sensor a second pressure within canister 24 to output the detected pressure to ECU 72.

When a predetermined period of time (e.g. five hours) has passed since engine 10 and the vehicle stopped, ECU 72 determines, prior to the failure diagnosis on fuel vapor purge system 20, whether or not the failure diagnosis is to be executed. More specifically, when the failure diagnosis is conducted on fuel vapor purge system 20, the negative pressure is applied to the inside of canister 24 by electric pump module 70, as described above. At this time, if the amount of the adsorbed fuel vapor in canister 24 is close to a saturation state, fuel vapor generated from fuel tank 22 cannot be adsorbed in canister 24 and accordingly a large amount of fuel vapor is discharged into the atmosphere. Therefore, when the amount of adsorbed fuel vapor in canister 24 is equal to or more than a predetermined amount, ECU 72 does not carry out the failure diagnosis.

In contrast, when canister 24 has sufficient adsorption ability, fuel vapor generated from fuel tank 22 when the negative pressure is applied by electric pump module 70 is adsorbed in canister 24 and thus the fuel vapor is not discharged into the atmosphere. Accordingly, when the amount of adsorbed fuel vapor in canister 24 is smaller than the predetermined amount, ECU 72 carries out the failure diagnosis.

When ECU 72 determines to execute the failure diagnosis, ECU 72 outputs a command to operate the electric air pump and the switching valve to electric pump module 70 and then receives the above-described first and second pressures from the pressure sensor of electric pump module 70. Using the detected first and second pressure values respectively as a determination pressure Pref and a measurement pressure P for the failure diagnosis, ECU 72 executes a failure diagnostic process.

While the failure diagnosis is performed on fuel vapor purge system 20, ECU 72 outputs a control command to purge control valve 64 to close purge control valve 64, so that the inside of the evaporation path is a closed space.

It is noted that, in the foregoing description, electric pump module 70 corresponds to "pressure difference generation means."

Figure 2:
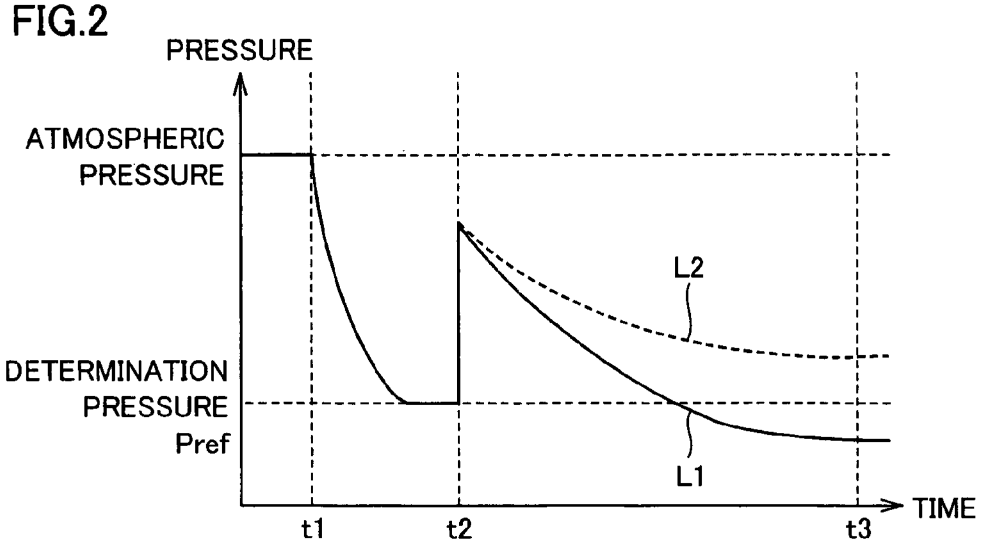
FIG. 2 shows a change in pressure when failure diagnosis is performed on the fuel vapor purge system.

FIG. 2 shows a change in pressure when failure diagnosis is performed on fuel vapor purge system 20. In FIG. 2, after time t2, the solid line L1 indicates a pressure change in a normal state of the evaporation path and the dotted line L2 indicates a pressure change in an abnormal state (hole is present) of the evaporation path.

Referring to FIG. 2, at time t1, execution of the failure diagnosis is started. In response to an operation command from ECU 72, electric pump module 70 starts measuring determination pressure Pref using the reference hole. Then, ECU 72 uses, as determination pressure Pref for the failure diagnosis, the pressure detected when the change in detected pressure value from electric pump module 70 becomes sufficiently small.

At time t2, in response to an operation command from ECU 72, electric pump module 70 starts applying a negative pressure to canister 24. When the evaporation path is in the normal state, namely when the evaporation path does not have any hole larger than the reference hole, the pressure in canister 24 is lower than determination pressure Pref Accordingly, ECU 72 determines that the evaporation path is in the normal state. In contrast, when the evaporation path is in the abnormal state, namely when the evaporation path has a hole larger than the reference hole, the pressure in canister 24 does not decrease to determination pressure Pref Accordingly, ECU 72 determines that the evaporation path is in the abnormal state.

Figure 3:
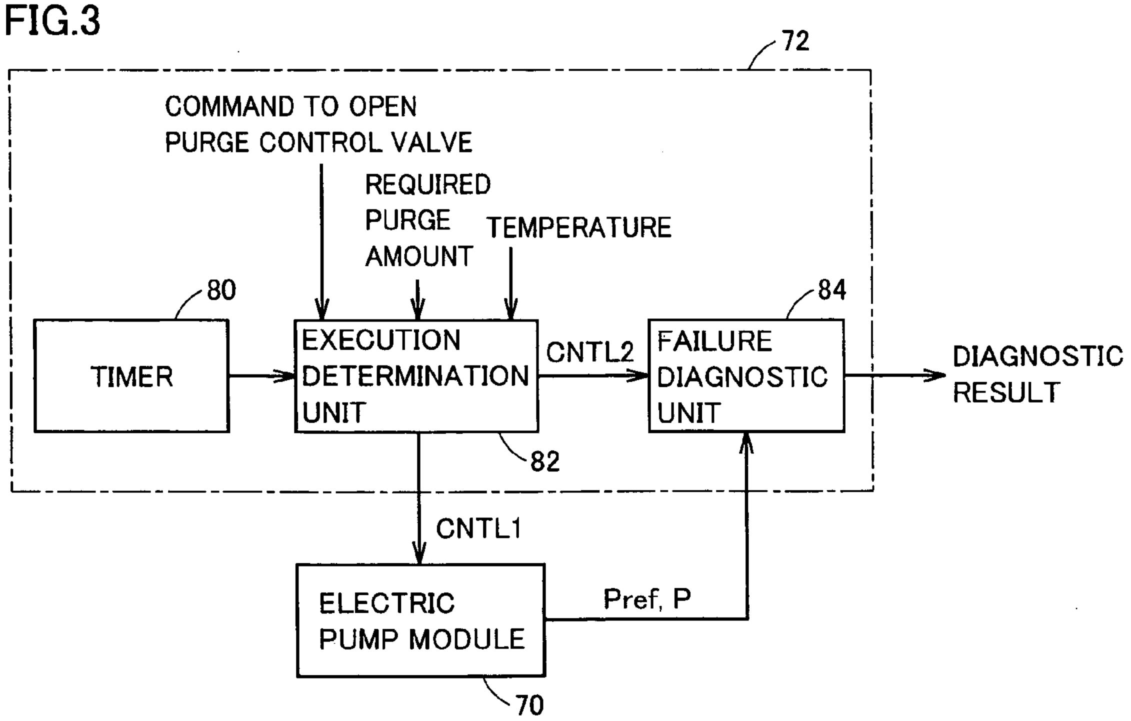
FIG. 3 is a functional block diagram showing a configuration involved in a failure diagnostic process of an ECU shown in FIG. 1.

FIG. 3 is a functional block diagram showing a configuration involved in a failure diagnostic process of ECU 72 shown in FIG. 1.

Referring to FIG. 3, ECU 72 includes a timer 80, an execution determination unit 82 and a failure diagnostic unit 84. Timer 80 measures the period of time from the stop of engine 10 and the vehicle to the start of execution of failure diagnosis on fuel vapor purge system 20. The count value of timer 80 is also used by execution determination unit 82 for calculating cumulative valve-opening period of time of purge control valve 64.

While engine 10 is running, execution determination unit 82 counts the cumulative valve-opening period of time of purge control valve 64 based on a command to open purge control valve 64 provided on purge passage 28 (or based on valve-opening record). Then, based on the cumulative valve-opening period of time, execution determination unit 82 calculates a cumulative purge amount while engine 10 is running. Further, receiving from timer 80 notification that a predetermined period of time has passed since engine 10 and the vehicle stopped, execution determination unit 82 uses for example an engine water temperature gauge to obtain the temperature at this time.

Furthermore, execution determination unit 82 reads from the ROM (not shown) a table of required purge amount. Here, the required purge amount is used for determining whether or not the amount of vapor adsorbed in canister 24 when the failure diagnosis is executed is an appropriate amount. Execution determination unit 82 compares, with the required purge amount, the calculated cumulative purge amount while engine 10 is running. When it is determined that the cumulative purge amount is larger than a required purge amount G1, execution determination unit 82 determines that the failure diagnosis can be executed. When execution determination unit 82 determines that the cumulative purge amount is equal to or less than required purge amount G1, it does not execute the failure diagnosis.

More specifically, suppose that an appropriate amount of fuel vapor is purged while engine 10 is running prior to failure diagnosis. Then, the amount of fuel vapor adsorbed in canister 24 should decrease. Thus, canister 24 has sufficient adsorption ability. In this case, it does not occur, when the failure diagnosis is conducted, a large amount of fuel vapor is discharged to the atmosphere. Accordingly, when an appropriate amount of fuel vapor is purged while engine 10 is running before failure diagnosis, execution determination unit 82 instructs electric pump module 70 and failure diagnostic unit 84 to start the failure diagnosis.

In contrast, suppose that a sufficient amount of fuel vapor is not purged while engine 10 is running prior to failure diagnosis. Then, the inside of canister 24 is filled with fuel vapor. When the failure diagnosis is carried out in this state, a large amount of fuel vapor is discharged to the atmosphere due to insufficient adsorption ability of canister 24. Accordingly, when the amount of purged fuel vapor is insufficient while engine 10 is running before failure diagnosis, execution determination unit 82 does not execute the failure diagnosis.

When execution determination unit 82 determines that the failure diagnosis can be executed, execution determination unit 82 outputs control commands CNTL1 and CNTL2 respectively to electric pump module 70 and failure diagnostic unit 84.

A higher temperature causes a larger amount of fuel vapor to be generated from fuel tank 22, resulting in an increase in amount of fuel vapor adsorbed in canister 24. Consequently, canister 24 has insufficient adsorption ability when the failure diagnosis is performed. Therefore, when the temperature is higher, it is necessary to purge a sufficient amount of fuel vapor in advance. The required purge amount is thus dependent on the temperature.

Figures 4, 5:
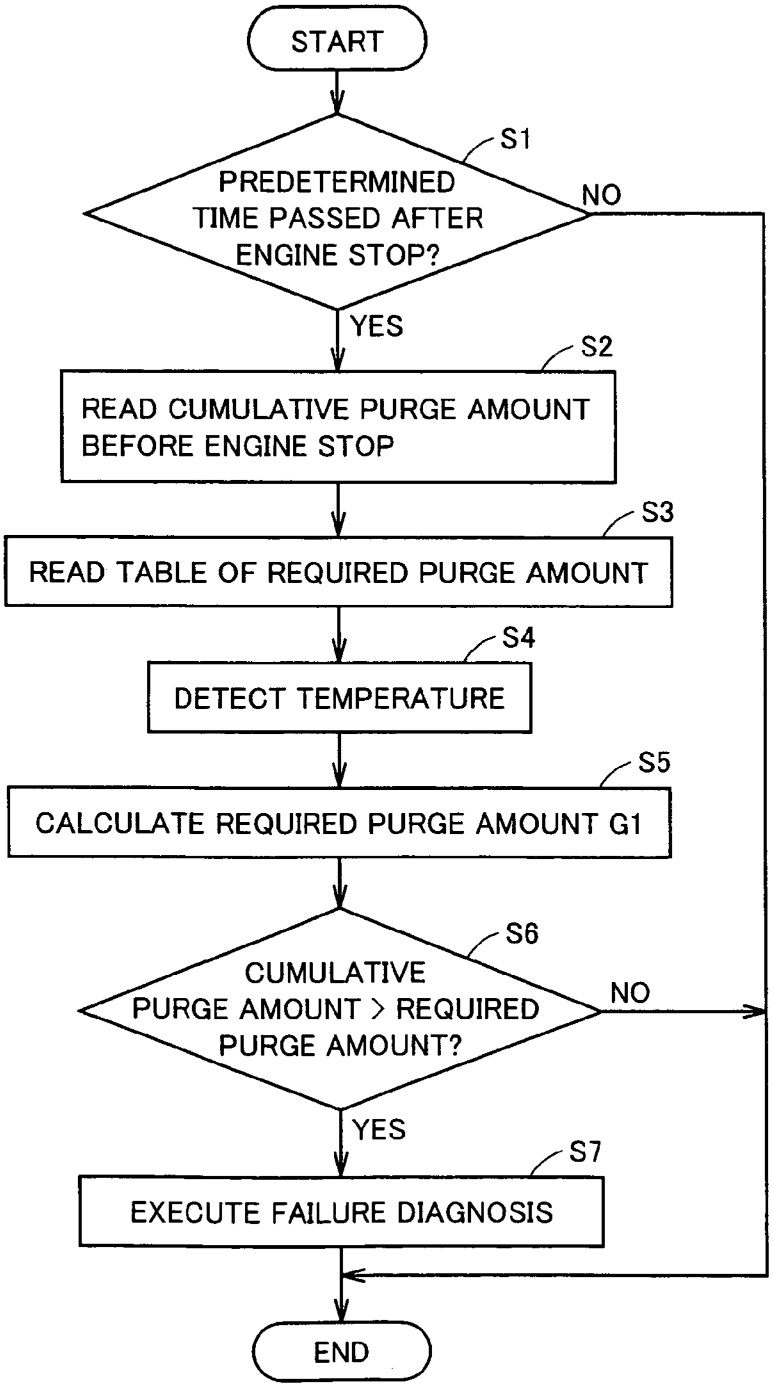
FIG. 4 shows temperature dependency of a required purge amount used by an execution determination unit shown in FIG. 3 for determining whether or not failure diagnosis can be executed.
FIG. 5 is a flowchart showing the failure diagnostic process for the failure purge system that is followed by the ECU shown in FIG. 3.

FIG. 4 shows the temperature dependency of the required purge amount used by execution determination unit 82 shown in FIG. 3 for determining whether or not failure diagnosis can be executed. Referring to FIG. 4, it is seen that the required purge amount is larger as the temperature is higher, which means that fuel vapor has to be purged more sufficiently in advance of failure diagnosis when the temperature is higher. The values of the required purge amount are shown in FIG. 4 by way of example and the required purge amount used in determining whether or not failure diagnosis can be executed is not limited to these values.

Referring again to FIG. 3, failure diagnostic unit 84 performs failure diagnosis on the evaporation path based on determination pressure Pref and measurement pressure P measured when a negative pressure is applied into canister 24 that are provided from electric pump module 70. When failure diagnostic unit 84 determines that measurement pressure P is lower than determination pressure Pref, it determines that the evaporation path is in a normal state. When failure diagnostic unit 84 determines that measurement pressure P is equal to or higher than determination pressure Pref, it determines that the evaporation path has any abnormality. Then, failure diagnostic unit 84 outputs the diagnostic result based on this result of the determination.

It is noted that, in the foregoing description, execution determination unit 82 corresponds to "execution determination means" and failure diagnostic unit 84 corresponds to "failure diagnostic means."

FIG. 5 is a flowchart showing a failure diagnostic process performed by ECU 72 shown in FIG. 3 on fuel vapor purge system 20.

Referring to FIG. 5, execution determination unit 82 of ECU 72 determines, whether or not a predetermined period of time has passed from the stop of engine 10 to the execution of failure diagnosis (step S1). When execution determination unit 82 determines that the predetermined time has not passed, it does not execute the failure diagnosis and accordingly the process is ended.

When execution determination unit 82 determines, based on notification from timer 80, that the predetermined time has passed, it reads from the RAM a cumulative purge amount calculated while engine 10 is running before being stopped (step S2). Execution determination unit 82 then reads the table of required purge amount from the ROM (step S3). The temperature at this time that is detected for example by the engine water temperature gauge is provided to execution determination unit 82 (step S4).

Based on the read table of required purge amount, execution determination unit 82 calculates a required purge amount that is required at the detected temperature (step S5) to determine whether or not the cumulative purge amount is larger than the required purge amount (step S6). When execution determination unit 82 determines that the cumulative purge amount is equal to or smaller than the required purge amount, the process is accordingly ended.

When execution determination unit 82 determines that the cumulative purge amount is larger than the required purge amount, it outputs a control command to electric pump module 70 and failure diagnostic unit 84. Then, electric pump module 70 and failure diagnostic unit 84 carry out failure diagnosis (step S7). Based on determination pressure Pref measured by electric pump module 70 using the reference hole as well as measurement pressure P measured when the negative pressure is applied to the evaporation path, the failure diagnosis is performed by failure diagnostic unit 84.

Figure 6:
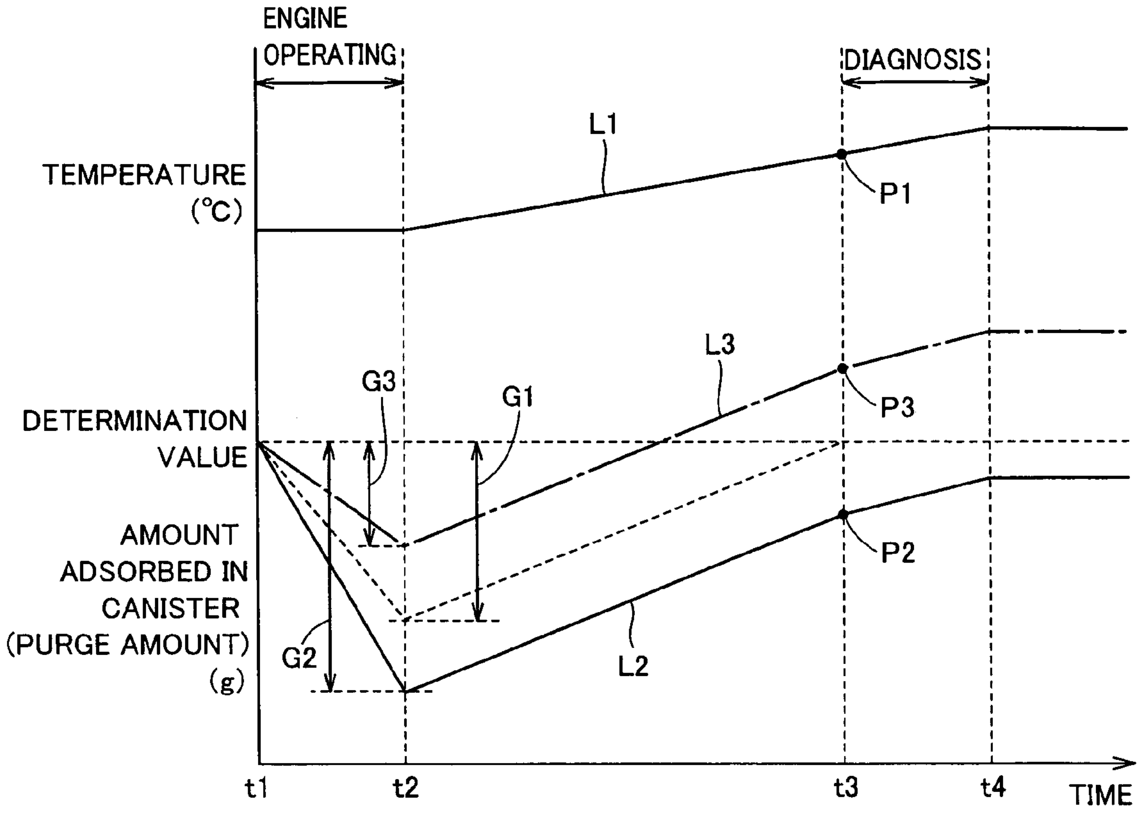
FIG. 6 shows, as an example, how an amount adsorbed in a canister changes before failure diagnosis on the fuel vapor purge system.

FIG. 6 shows, as an example, how the amount adsorbed in canister 24 changes before failure diagnosis on fuel vapor purge system 20. In FIG. 6, for two cases in which respective cumulative purge amounts are different from each other while engine 10 is running, respective changes in amount adsorbed in canister 24 are shown.

Referring to FIG. 6, the solid line L1 indicates a temperature change. The solid line L2 indicates a change in amount adsorbed in canister 24 when failure diagnosis is performed while the chain line L3 indicates a change in amount adsorbed in canister 24 when failure diagnosis is not performed.

A description is first given of the change in amount adsorbed in canister 24 when the failure diagnosis is executed that is indicated by the solid line L2. In the period t1-t2, engine 10 is running so that the amount adsorbed in the canister decreases due to purging of fuel vapor from canister 24. At time t2 and thereafter, engine 10 is stopped. Then, at time t3 when a predetermined period of time (e.g. five hours) has passed, execution determination unit 82 determines whether or not failure diagnosis is to be executed.

A larger amount of fuel vapor is generated from fuel tank 22 as the temperature is higher. Then, with the increase of the temperature after time t2 indicated by the solid line L1, the amount adsorbed in canister 24 after time t2 also increases. However, at time t3 at which it is determined whether or not failure diagnosis is executed, the amount (P2) adsorbed in canister 24 is smaller than the determination value based on which whether or not failure diagnosis is to be carried out is determined, which means that canister 24 still has sufficient adsorption ability. In this case, the failure diagnosis is executed.

Specifically, based on the determination value of the amount adsorbed in canister 24 that is used for determining whether or not failure diagnosis can be executed, required purge amount G1 related to the temperature (P1) at this time is determined. Since cumulative purge amount G2 while engine 10 is running is larger than required purge amount G1, the amount (P2) adsorbed in canister 24 at time t3 is smaller than the determination value.

In contrast, regarding the change in amount adsorbed in canister 24 that is indicated by the chain line L3, since cumulative purge amount G3 while engine 10 is running is smaller than required purge amount G1, the amount (P3) adsorbed in canister 24 at time t3 is larger than the determination value. Accordingly, failure diagnosis on fuel vapor purge system 20 is not carried out.

Figure 7:
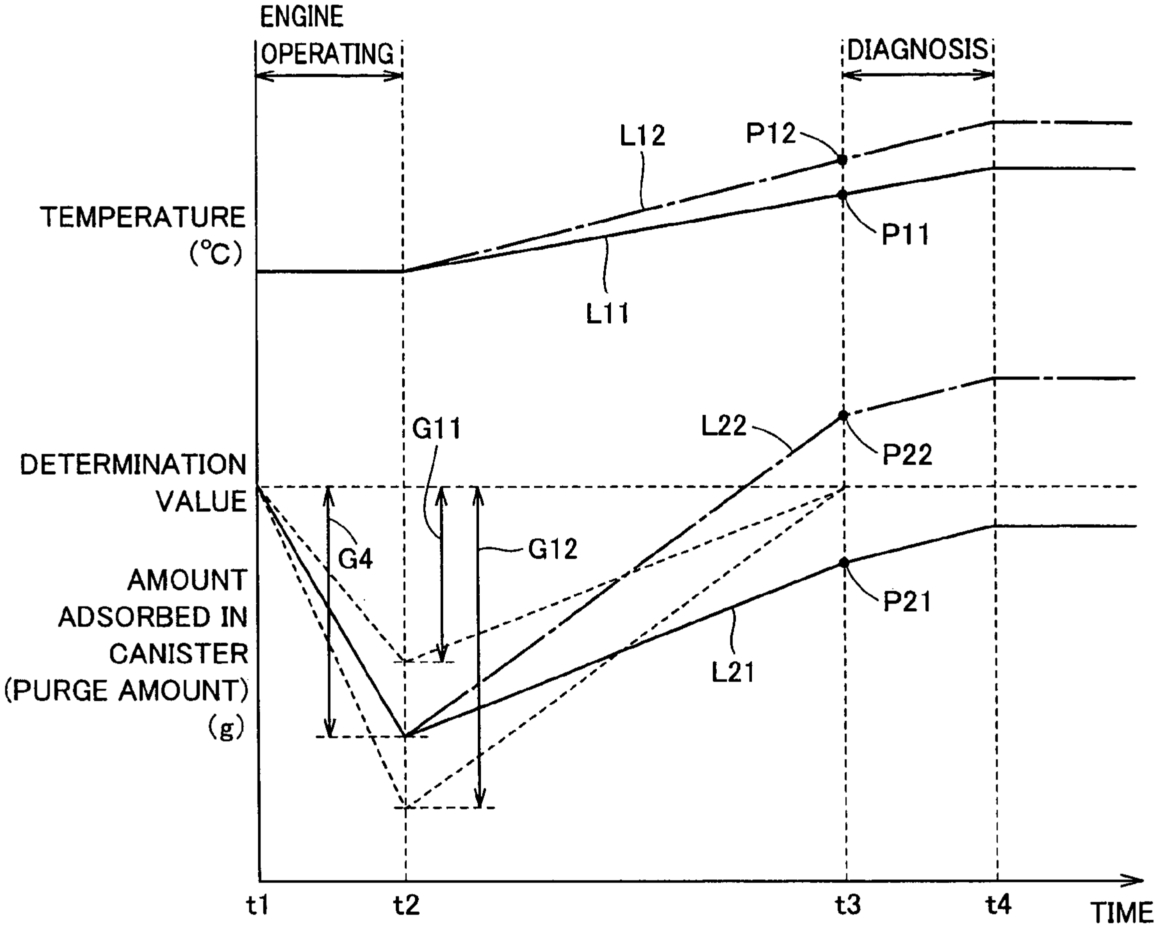
FIG. 7 shows, as another example, how an amount adsorbed in the canister changes before failure diagnosis on the fuel vapor purge system.

FIG. 7 shows, as another example, how the amount adsorbed in canister 24 changes before failure diagnosis on fuel vapor purge system 20. In FIG. 7, for two cases in which respective temperatures when failure diagnosis is performed are different from each other, respective changes in amount adsorbed in canister 24 are shown.

Referring to FIG. 7, the solid line L11 indicates a temperature change when failure diagnosis is performed and the chain line L12 indicates a temperature change when failure diagnosis is not performed. The solid line L21 relates to the solid line L11 to indicate a change in amount adsorbed in canister 24 when the failure diagnosis is performed. The chain line L22 relates to the chain line L12 to indicate a change in amount adsorbed in canister 24 when the failure diagnosis is not performed.

A description is first given of the change in amount adsorbed in canister 24 when the failure diagnosis is performed as indicated by the solid lines L11 and L12. In the period t1-t2, engine 10 is running so that purging of fuel vapor from canister 24 causes the amount adsorbed in the canister to decrease. At time t2 and thereafter, engine 10 is stopped. Then, at time t3 when a predetermined time has passed, execution determination unit 82 determines whether or not the failure diagnosis is to be executed.

As the temperature indicated by the solid line L11 increases after time t2, the amount adsorbed in canister 24 that is indicated by the solid line L21 also increases after time t2. At time t3 at which the determination is made as to whether or not the failure diagnosis is to be executed, the amount (P21) adsorbed in canister 24 is smaller than the determination value based on which it is determined whether or not failure diagnosis is executed. Canister 24 thus has sufficient adsorption ability so that the failure diagnosis is executed.

Specifically, based on the determination value of the amount adsorbed in canister 24 that is used for determining whether or not failure diagnosis is to be executed, required purge amount G11 related to the temperature (P11) at this time is determined. Since cumulative purge amount G4 while engine 10 is running is larger than required purge amount G11, the amount (P21) adsorbed in canister 24 at time t3 is smaller than the determination value.

In contrast, regarding the change in amount adsorbed in canister 24 that is indicated by the chain lines L12 and L22, the degree of increase in temperature after time t2 is larger than that indicated by the solid lines L11 and L21 and the temperature (P12) at time t3 is higher than the temperature (P11) indicated by solid lines L11 and L21.

Based on the determination value of the amount adsorbed in canister 24 that is used for determining whether or not failure diagnosis can be executed, required purge amount G12 related to the temperature (P12) at this time is determined. Since the temperature is higher, required purge amount G12 in advance of failure diagnosis is larger than required purge amount G11 indicated by solid lines L11, and L21. Further, since cumulative purge amount G4 while engine 10 is running is smaller than required purge amount G12, the amount (P22) adsorbed in canister 24 at time t3 is larger than the determination value. Thus, failure diagnosis on fuel vapor purge system 20 is not executed.

As discussed above, according to the first embodiment, execution determination unit 82 estimates, based on the purge amount while engine 10 is running before failure diagnosis, whether or not the amount adsorbed in canister 24 is smaller than a predetermined determination value. When execution determination unit 82 determines that the amount adsorbed in canister 24 is smaller than the predetermined determination value, it instructs electric pump module 70 and failure diagnostic unit 84 to perform failure diagnosis. When the amount adsorbed in canister 24 is larger, the failure diagnosis is not performed so that discharge of fuel vapor to the outside can be prevented.

Further, according to the first embodiment, execution determination unit 82 requests a larger required purge amount while engine 10 is running before failure diagnosis when the temperature is higher. Accordingly, the determination as to whether failure diagnosis is to be executed or not can be made with higher precision considering the temperature of fuel vapor purge system 20.

Furthermore, according to the first embodiment, execution determination unit 82 calculates a purge amount based on the valve-opening period of time of purge control valve 64. Thus, it is unnecessary to separately provide any apparatus for detecting the purge amount and accordingly a significant cost increase is avoided.

In the foregoing description, although the required purge amount calculated in advance of failure diagnosis is determined based on the temperature when failure diagnosis is performed, the required purge amount may be determined based on the aforementioned temperature and further in consideration of the amount of change in temperature from the stop of engine 10 to the start of failure diagnosis. Specifically, the amount adsorbed in canister 24 varies not only depending on the absolute value of the temperature but also depending on the amount of change in temperature. Then, if the amount of change in temperature can correctly be measured, the required purge amount can more precisely be determined. When the temperature of canister 24 or fuel tank 22 cannot directly be measured and the temperature is measured using an engine water temperature gauge for example, however, the actual change in temperature of canister 24 or fuel tank 22 could erroneously be measured. Therefore, according to the first embodiment, the required purge amount is determined based solely on the temperature when failure diagnosis is performed.

Second Embodiment

In the first embodiment, based on the purge amount while the engine is running before failure diagnosis, it is estimated whether or not the amount adsorbed in canister 24 is smaller than a predetermined determination value to determine whether or not failure diagnosis can be executed. In the second embodiment, the concentration of vapor in canister 24 is actually measured for failure diagnosis and, based on the measurement result, it is determined whether or not failure diagnosis can be executed.

Figure 8:
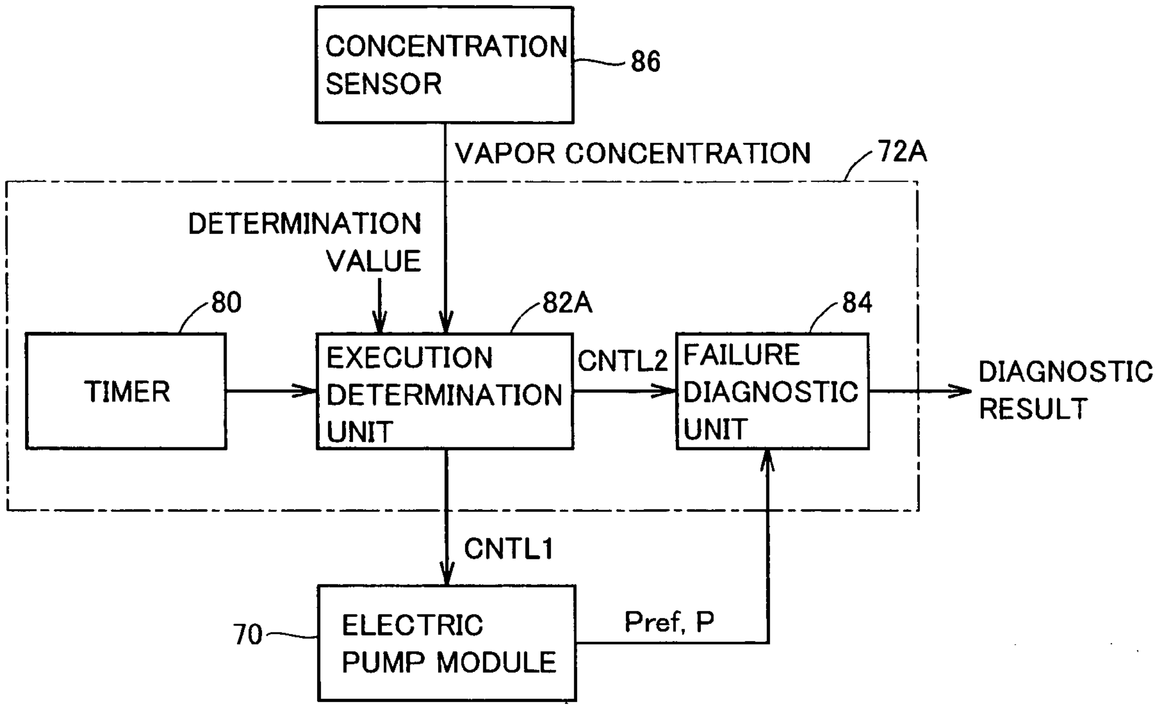
FIG. 8 is a functional block diagram showing a configuration involved in a failure diagnostic process of an ECU according to a second embodiment.

FIG. 8 is a functional block diagram showing a configuration involved in a failure diagnostic process by an ECU according to a second embodiment.

Referring to FIG. 8, ECU 72A in the second embodiment includes an execution determination unit 82A instead of execution determination unit 82 in the configuration of ECU 72 of the first embodiment.

A concentration sensor 86 is provided to canister 24 for detecting the vapor concentration in canister 24 and outputting the detected vapor concentration to ECU 72A. It is noted that concentration sensor 86 corresponds to "concentration detection means."

Receiving from timer 80 notification that a predetermined time has passed since engine 10 and the vehicle stopped, execution determination unit 82A receives the vapor concentration in canister 24 from concentration sensor 86. Further, execution determination unit 82A reads from a ROM (not shown) a determination value of the vapor concentration used for determining whether or not failure diagnosis is to be performed.

When the vapor concentration detected by concentration sensor 86 is lower than the determination value read from the ROM, execution determination unit 82A determines that failure diagnosis can be executed since a large amount of fuel vapor will not be discharged to the atmosphere even if the failure diagnosis is executed. When the vapor concentration detected by concentration sensor 86 is equal to or higher than the determination value, execution determination unit 82A does not execute failure diagnosis since a large amount of fuel vapor will be discharged to the atmosphere if the failure diagnosis is executed.

In the forgoing description, execution determination unit 82A may use an engine water temperature gauge for example to obtain the temperature at the time to correct, based on the temperature, the determination value of the vapor concentration. Specifically, since a higher temperature causes a larger amount of fuel vapor to be generated from fuel tank 22 and accordingly a larger amount of vapor is adsorbed in canister 24, the determination value may be corrected to a lower value when the temperature is higher in the failure diagnostic process.

As heretofore discussed, according to the second embodiment, execution determination unit 82A instructs electric pump module 70 and failure diagnostic unit 84 to execute failure diagnosis when the vapor concentration detected by concentration sensor 86 is smaller than a predetermined concentration. Thus, when the amount adsorbed in canister 24 is large, the failure diagnosis is not performed so that discharge of fuel vapor to the atmosphere can be prevented.

In the above embodiments each, electric pump module 70 generates a negative pressure in the evaporation path when failure diagnosis is conducted. The pressure applied to the inside of the evaporation path when the failure diagnosis is performed, however, is not limited to the negative pressure. The present invention covers an embodiment in which the pressure in the evaporation path is higher than the outside air. In particular, the advantage of the present invention is exhibited when the air is taken from the inside of the evaporation path to apply a negative pressure.

In the first embodiment described above, the purge amount is calculated based on the valve-opening period of time of purge control valve 64. The method of calculating the purge amount of the present invention, however, is not limited to the aforementioned one and the present invention is applicable to other calculation methods.

Furthermore, although the water temperature gauge for engine 10 is used as the temperature measurement means in the foregoing description, the temperature may be measured using a separately provided temperature sensor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A failure diagnostic apparatus for a fuel vapor purge system adsorbing in a canister fuel vapor generated in a fuel tank and purging the adsorbed fuel vapor into an intake system, comprising:

pressure difference generation means for generating, when failure diagnosis is executed, a pressure difference between respective pressures inside and outside a fuel vapor path including said fuel tank and said canister;

failure diagnostic means for comparing, with a predetermined reference pressure, the pressure inside said fuel vapor path when said pressure difference generation means generates said pressure difference, for conducting said failure diagnosis to determine whether failure occurs or not based on result of the comparison;

execution determination means for determining, based on whether or not an amount of fuel vapor in said fuel vapor path is smaller than a predetermined reference amount, whether or not said failure diagnosis is to be executed by said pressure difference generation means and said failure diagnostic means; and said execution determination means determines, when an amount of fuel vapor adsorbed in said canister is smaller than a first predetermined amount, that said amount of fuel vapor in said fuel vapor path is smaller than said predetermined reference amount.

2. The failure diagnostic apparatus for the fuel vapor purge system according to claim 1, wherein said pressure difference generation means generates a negative pressure, relative to outside air, in said fuel vapor path.

3. A fuel vapor purge apparatus comprising the failure diagnostic apparatus for the fuel vapor purge system recited in claim 1.

4. A combustion engine comprising the failure diagnostic apparatus for the fuel vapor purge system recited in claim 1.

5. The failure diagnostic apparatus for the fuel vapor purge system according to claim 1, wherein said execution determination means estimates said amount of fuel vapor adsorbed in said canister based on a purge amount of said fuel vapor.

6. The failure diagnostic apparatus for the fuel vapor purge system according to claim 5, wherein said purge amount is cumulative purge amount while a combustion engine is running before said failure diagnosis.

7. The failure diagnostic apparatus for the fuel vapor purge system according to claim 5, wherein said execution determination means calculates said purge amount based on a valve-opening period of time of a purge control valve provided on a purge passage connecting said canister to said intake system.

8. The failure diagnostic apparatus for the fuel vapor purge system according to claim 5, wherein said execution determination means determines, when said purge amount of said fuel vapor is larger than a second predetermined amount, that said amount of fuel vapor adsorbed in said canister is smaller than said first predetermined amount.

9. The failure diagnostic apparatus for the fuel vapor purge system according to claim 8, wherein said second predetermined amount is larger as temperature of said fuel vapor purge system is higher.

10. The failure diagnostic apparatus for the fuel vapor purge system according to claim 8, wherein said second predetermined amount is larger as an increase in temperature of said fuel vapor purge system is larger.

11. A failure diagnostic apparatus for a fuel vapor purge system adsorbing in a canister fuel vapor generated in a fuel tank and purging the adsorbed fuel vapor into an intake system, comprising:

pressure difference generation means for generating, when failure diagnosis is executed, a pressure difference between respective pressures inside and outside a fuel vapor path including said fuel tank and said canister;

failure diagnostic means for comparing, with a predetermined reference pressure, the pressure inside said fuel vapor path when said pressure difference generation means generates said pressure difference, for conducting said failure diagnosis to determine whether failure occurs or not based on result of the comparison;

concentration detection means for detecting a concentration of the fuel vapor in said fuel vapor path; and execution determination means for determining, based on whether or not said concentration of the fuel vapor detected by said concentration detection means is lower than a predetermined value, whether or not said failure diagnosis is to be executed by said pressure difference generation means and said failure diagnostic means.

12. The failure diagnostic apparatus for the fuel vapor purge system according to claim 11, wherein said pressure difference generation means generates a negative pressure, relative to outside air, in said fuel vapor path.

13. A fuel vapor purge apparatus comprising the failure diagnostic apparatus for the fuel vapor purge system recited in claim 11.

14. A combustion engine comprising the failure diagnostic apparatus for the fuel vapor purge system recited in claim 11.

* * * * *